(12) United States Patent
Redi (10) Patent No.: US 7,865,568 B1
(45) Date of Patent: Jan. 4, 2011

(54) SYSTEMS AND METHODS FOR CONTROLLING APPLIANCES VIA A NETWORK

(75) Inventor: Jason Keith Redi, Somerville, MA (US)

(73) Assignees: Verizon Corporate Services Group Inc., Basking Ridge, NJ (US); Raytheon BBN Technologies Corp., Basking Ridge, NJ (US)

( * ) Notice: Subject to any disclaimer, the term of this patent is extended or adjusted under 35 U.S.C. 154(b) by 0 days.

(21) Appl. No.: 09/572,682

(22) Filed: May 16, 2000

(51) Int. Cl.
  *G06F 15/16* (2006.01)
(52) U.S. Cl. .................................................. 709/217
(58) Field of Classification Search ................. 703/223, 703/224, 202, 204, 208; 340/286.02, 825.06, 340/825, 3.1, 3.4, 3.54, 3.55; 348/211.3, 348/558, 552, 211.99, 211.1, 211.2, 211.4; 379/102.03, 102.02; 709/223, 224, 202, 709/204, 208, 217, 238, 250
See application file for complete search history.

(56) References Cited

U.S. PATENT DOCUMENTS

| | | | | |
|---|---|---|---|---|
| 5,452,291 A * | 9/1995 | Eisenhandler et al. | ....... | 370/402 |
| 5,467,264 A * | 11/1995 | Rauch et al. | .................. | 700/12 |
| 5,570,085 A * | 10/1996 | Bertsch | ..................... | 340/3.54 |
| 5,774,063 A | 6/1998 | Berry et al. | ............ | 340/825.69 |
| 5,903,259 A | 5/1999 | Brusky et al. | ................ | 345/168 |
| 5,915,026 A * | 6/1999 | Mankovitz | ................. | 713/168 |
| 6,005,861 A * | 12/1999 | Humpleman | ................ | 370/352 |
| 6,026,150 A * | 2/2000 | Frank et al. | ............... | 379/90.01 |
| 6,052,120 A * | 4/2000 | Nahi et al. | ................... | 715/700 |
| 6,208,378 B1 * | 3/2001 | Barraclough et al. | ..... | 348/211.1 |
| 6,208,384 B1 * | 3/2001 | Schultheiss | ................ | 348/552 |
| 6,211,782 B1 * | 4/2001 | Sandelman et al. | ......... | 340/506 |
| 6,252,883 B1 * | 6/2001 | Schweickart et al. | ........ | 370/441 |
| 6,256,378 B1 * | 7/2001 | Iggulden et al. | ........ | 379/102.03 |
| 6,281,880 B1 * | 8/2001 | Rose et al. | ................... | 345/158 |
| 6,295,448 B1 * | 9/2001 | Hayes et al. | ................ | 455/420 |
| 6,363,417 B1 * | 3/2002 | Howard et al. | .............. | 709/217 |
| 6,374,079 B1 * | 4/2002 | Hsu | .......................... | 455/11.1 |
| 6,400,968 B1 * | 6/2002 | White et al. | ................ | 455/572 |
| 6,481,013 B1 * | 11/2002 | Dinwiddie et al. | ............ | 725/80 |
| 6,493,875 B1 * | 12/2002 | Eames et al. | .................. | 725/81 |
| 6,526,581 B1 * | 2/2003 | Edson | ......................... | 725/74 |
| 6,545,722 B1 * | 4/2003 | Schultheiss et al. | ......... | 348/552 |
| 6,563,430 B1 * | 5/2003 | Kemink et al. | ......... | 340/825.49 |
| 6,574,234 B1 * | 6/2003 | Myer et al. | .................. | 370/462 |
| 6,731,201 B1 * | 5/2004 | Bailey et al. | ........... | 340/310.11 |

(Continued)

OTHER PUBLICATIONS

Chen, "Emerging home digital networking needs", Fourth International Workshop on Community Networking Proceedings, Sep. 11-12, 1997.*

(Continued)

*Primary Examiner*—William C Vaughn, Jr.
*Assistant Examiner*—Scott Christensen (57) ABSTRACT

A remote control device (140, 600) controls the operation of an appliance. The remote control device (140, 600) includes a receiver (320) or transceiver (620), a controller (330, 630), and a transmitter (350, 650). The receiver (320) or transceiver (620) receives a network packet that includes at least one command. The controller (330, 630) analyzes the network packet to determine whether the packet is intended for the remote control device (140, 600). The transmitter (350, 650) outputs a signal to control operation of the appliance based on the command when the controller (330, 630) determines that the packet is intended for the remote control device (140, 600).

18 Claims, 7 Drawing Sheets

U.S. PATENT DOCUMENTS

| | | | |
|---|---|---|---|
| 6,735,619 B1 * | 5/2004 | Sawada | 709/212 |
| 6,748,278 B1 * | 6/2004 | Maymudes | 700/17 |
| 6,781,518 B1 * | 8/2004 | Hayes et al. | 340/825.72 |
| 6,784,872 B1 * | 8/2004 | Matsui et al. | 345/169 |
| 6,791,467 B1 * | 9/2004 | Ben-Ze'ev | 340/825.69 |
| 6,915,342 B1 * | 7/2005 | Motoyama | 709/224 |
| 6,949,729 B1 * | 9/2005 | Ishikawa et al. | 219/702 |
| 6,956,833 B1 * | 10/2005 | Yukie et al. | 370/328 |
| 7,127,734 B1 * | 10/2006 | Amit | 725/80 |
| 2002/0011923 A1 * | 1/2002 | Cunningham et al. | 340/310.01 |
| 2003/0074450 A1 * | 4/2003 | Kang | 709/227 |

OTHER PUBLICATIONS

Douligeris, "Intelligent home systems", Communications Magazine, IEEE, vol. 31 Issue: 10, Oct. 1993.*

Corcoran et al., "User interface technologies for home appliances and networks", IEEE Transactions on Consumer Electronics, vol. 44 Issue: 3, Aug. 1988.*

* cited by examiner

SYSTEMS AND METHODS FOR CONTROLLING APPLIANCES VIA A NETWORK

BACKGROUND OF THE INVENTION

A. Field of the Invention

The present invention relates generally to remote control systems and, more particularly, to systems and methods for remotely controlling appliances via a network.

B. Description of Related Art

In the last several years, home networks have become increasingly common throughout the world. Home networks are often radio frequency-based so that computers and printers in different places in the home can easily communicate with one another regardless of their location and without installing wires.

The vision of the future home often includes home appliances, such as telephones and heating and cooling equipment, integrated into the home network. Such an integration would permit the addition of new appliances and allow these devices to easily communicate with each other. One day, all household appliances from refrigerators to televisions may be integrated into this home network.

The problem with such an integration is that it requires the appliance to be manufactured with the networking capability built into it. Because individuals typically keep the same appliances for decades or more, it may be a very long time before all of the appliances in a typical household include the networking capability.

Some conventional appliances, such as stereos and televisions, include a wireless control device in the form of a remote control. To control the operation of one of these devices, a user must physically push a button on a uniquely associated or universal remote control. The user normally gets audio or visual queues that the requested operation was received and performed by the appliance (e.g., the television changes the channel after the user presses a button on the remote control device). These appliances are not, however, easily integrated in a home network.

As a result, a need exists for a mechanism that facilitates the integration of conventional appliances in a home network.

SUMMARY OF THE INVENTION

Systems and methods consistent with the present invention address this need by providing a mechanism that permits conventional appliances to be integrated in a home network, thereby permitting the appliances to be controlled via a device directly or indirectly connected to the home network.

In accordance with the purpose of the invention as embodied and broadly described herein, a remote control device controls the operation of an appliance. The remote control device includes a receiver or transceiver, a controller, and a transmitter. The receiver/transceiver receives a network packet that includes at least one command. The controller analyzes the network packet to determine whether the packet is intended for the remote control device. The transmitter outputs a signal to control operation of the appliance based on the command when the controller determines that the packet is intended for the remote control device.

In another implementation consistent with the present invention, a network with multiple appliances includes a device and a remote control. The device generates a command for controlling one of the appliances. The remote control receives the command from the device, generates a control signal based on the command, and transmits the control signal to the appliance to control operation of the appliance.

In yet another implementation consistent with the present invention, a device in a network, including at least one device connected to multiple appliances via at least one remote control, includes a graphical user interface and a processor. The graphical user interface presents to a user a list of appliances and control options. The processor broadcasts a request to identify remote controls connected to the network and capabilities of the remote controls, receives responses from the remote controls, and generates the list of the appliances and control options from the received responses.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention facilitate the connection of conventional appliances to a home network. As such, the appliances may be controlled by a device either directly or indirectly connected to the network.

Exemplary Network

Figure 1:
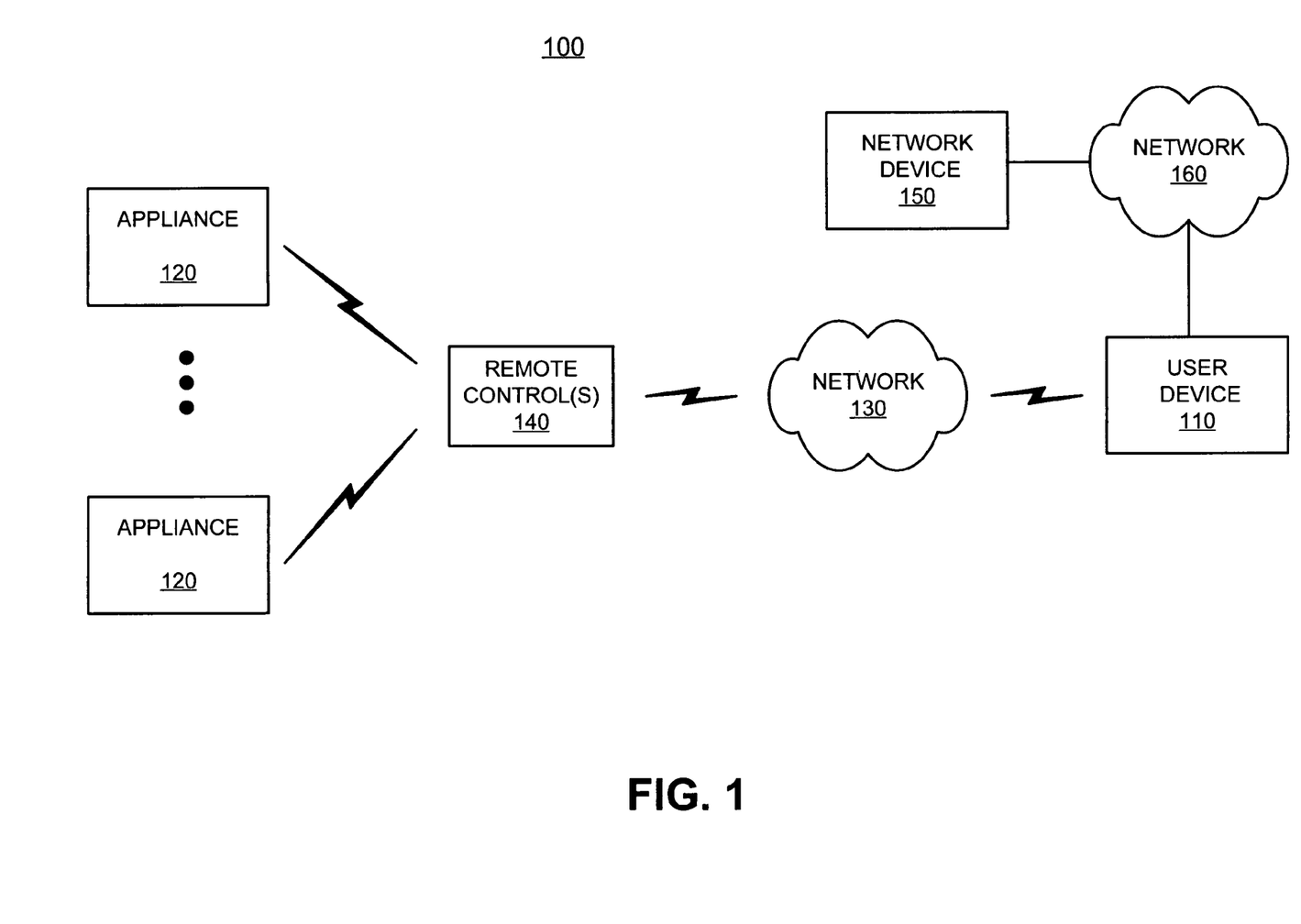
FIG. 1 is a diagram of an exemplary network consistent with the present invention.

FIG. 1 is a diagram of an exemplary network 100 consistent with the present invention. The network 100 may include a user device 110 connected to one or more appliances 120 via a network 130 and a remote control 140. The user device 110 may also connect to a network device 150 via a network 160. The user device 110 may include a personal computer, a laptop, a personal digital assistant (PDA), a cellular telephone, or a similar device.

Figure 2:
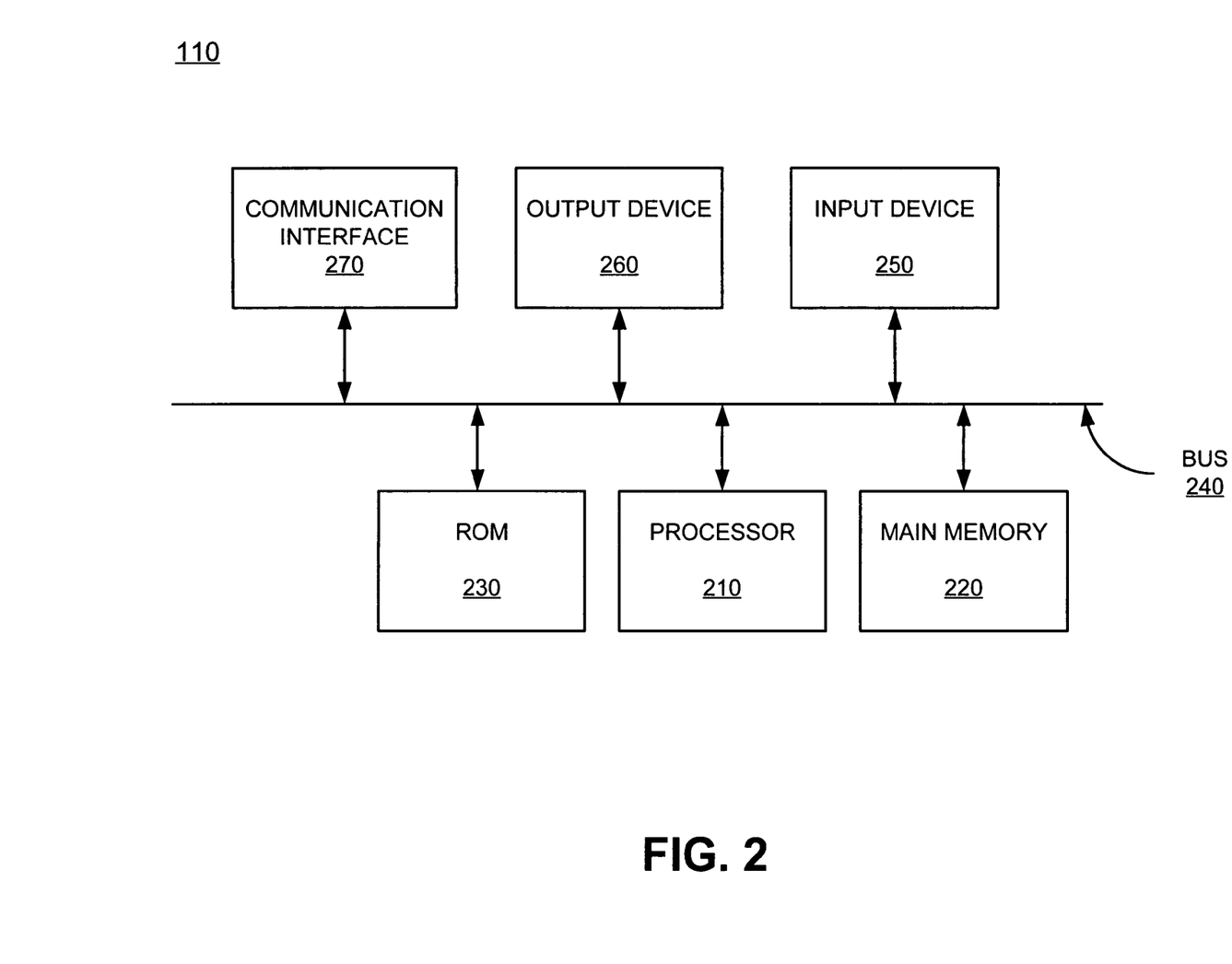
FIG. 2 is an exemplary diagram of a user device consistent with the present invention.

FIG. 2 is an exemplary diagram of the user device 110 consistent with the present invention. The user device 110 may include a processor 210, main memory 220, a read only memory (ROM) 230, a bus 240, an input device 250, an output device 260, and a communication interface 270.

The processor 210 may include any type of conventional processing device that interprets and executes instructions. Main memory 220 may include a random access memory (RAM), a large capacity storage device, such as a magnetic or optical recording medium and its corresponding drive, or another type of dynamic storage device. Main memory 220 may store information, instructions, and temporary variables for use by processor 210. ROM 230 may include a conventional ROM device or another type of static storage device that stores static information and instructions for the processor 210. The bus 240 may include a set of hardware lines (i.e., conductors) that permits data transfer among the components of the user device 110.

The input device 250 may include conventional input mechanisms, such as a keyboard, a mouse, a microphone, biometric mechanisms, or the like. The output device 260 may include conventional output mechanisms, such as a display, a pair of speakers, or the like. The communication interface 270 enables the user device 110 to communicate with other devices/systems via any communications medium. For example, the communication interface 270 may include a wireless transmitter for communicating with a remote control 140 (FIG. 1) via the network 130 or a modem for communicating with the network device 150 via the network 160. Alternatively, the communication interface may include any other type of interface that enables communication between the user device 110 and other devices or systems.

Returning to FIG. 1, the appliances 120 may include conventional devices, such as televisions, video cassette recorders (VCRs), digital versatile disk (DVD) players, stereos, camcorders, etc., that include infrared receiving ports. These conventional appliances 120 are designed to perform specific functions in response to commands received via their infrared (IR) receiving ports.

The network 130 may include a wireless network that permits the user device 110 to communicate with the remote control 140 using, for example, radio frequency (RF) technologies. The network 160 may include the Internet, an intranet, a local area network (LAN), a wide area network (WAN), the public switched telephone network (PSTN), or another type of network. The network 160 permits the network device 150 to communicate with the user device 110. The network device 150 may include a personal computer, a laptop, a PDA, a cellular or digital telephone, or the like, and may be configured similarly to the user device 110 described with respect to FIG. 2. The network device 150 may communicate with the user device 110 to control an appliance 120 via a remote control 140.

Figure 3:
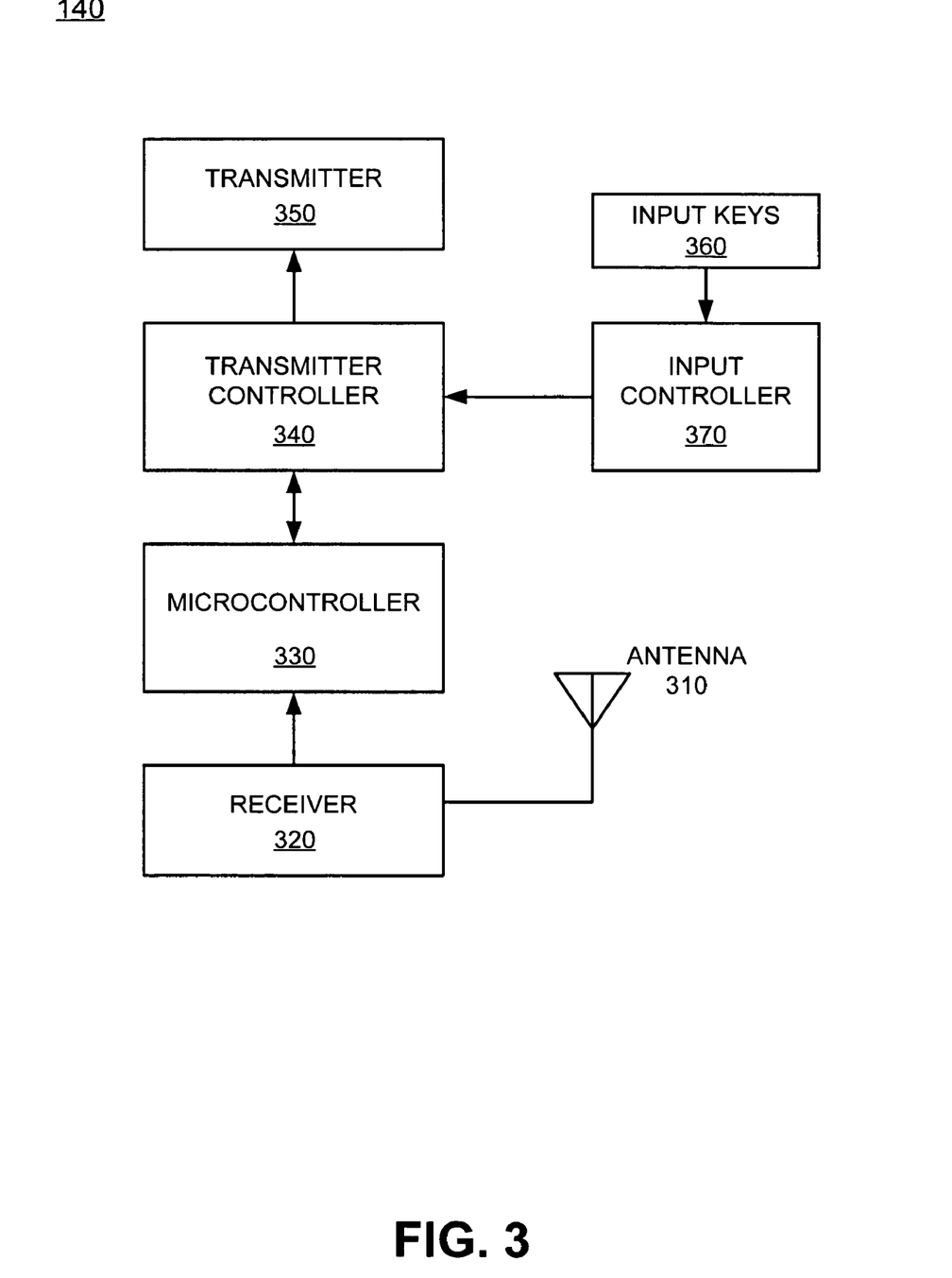
FIG. 3 is an exemplary diagram of a remote control in an implementation consistent with the present invention.

The remote control 140 sends command signals to the appliances 120 to instruct the appliances 120 to perform certain operations, such as changing channels or volume, playing or recording a movie or a song, etc. FIG. 3 is an exemplary diagram of the remote control 140 in an implementation consistent with the present invention. The remote control 140 may include an antenna 310, a receiver 320, a microcontroller 330, a transmitter controller 340, a transmitter 350, input keys 360, and an input controller 370.

The antenna 310 may include a conventional antenna for receiving RF signals. The receiver 320 may include an RF receiver that interprets the RF signals received by the antenna 310 and an analog-to-digital converter that converts the RF signals to digital signals for use by the microcontroller 330. The microcontroller 330 may include any processing device with simple networking capabilities. The microcontroller 330 analyzes the digital signals from the receiver 320 to determine whether the digital signals are addressed to the remote control 140 and whether the remote control 140 is capable of performing any command included in the digital signals.

The transmitter controller 340 may include a conventional control device that controls the transmission of IR signals via the transmitter 350. The transmitter controller 340 receives inputs from the microcontroller 330 and the input keys 360 via the input controller 370. The input keys 360 may include conventional input controls, such as buttons, that permit a user to input particular commands into the remote control 140. The input controller 370 includes a conventional control device that interprets the operation of the input keys 360 and generates a command signal for transmission by the transmitter 350. The transmitter 350 may include an IR transmitter that transmits an IR signal as instructed by the transmitter controller 340.

Exemplary Processing

Figure 4:
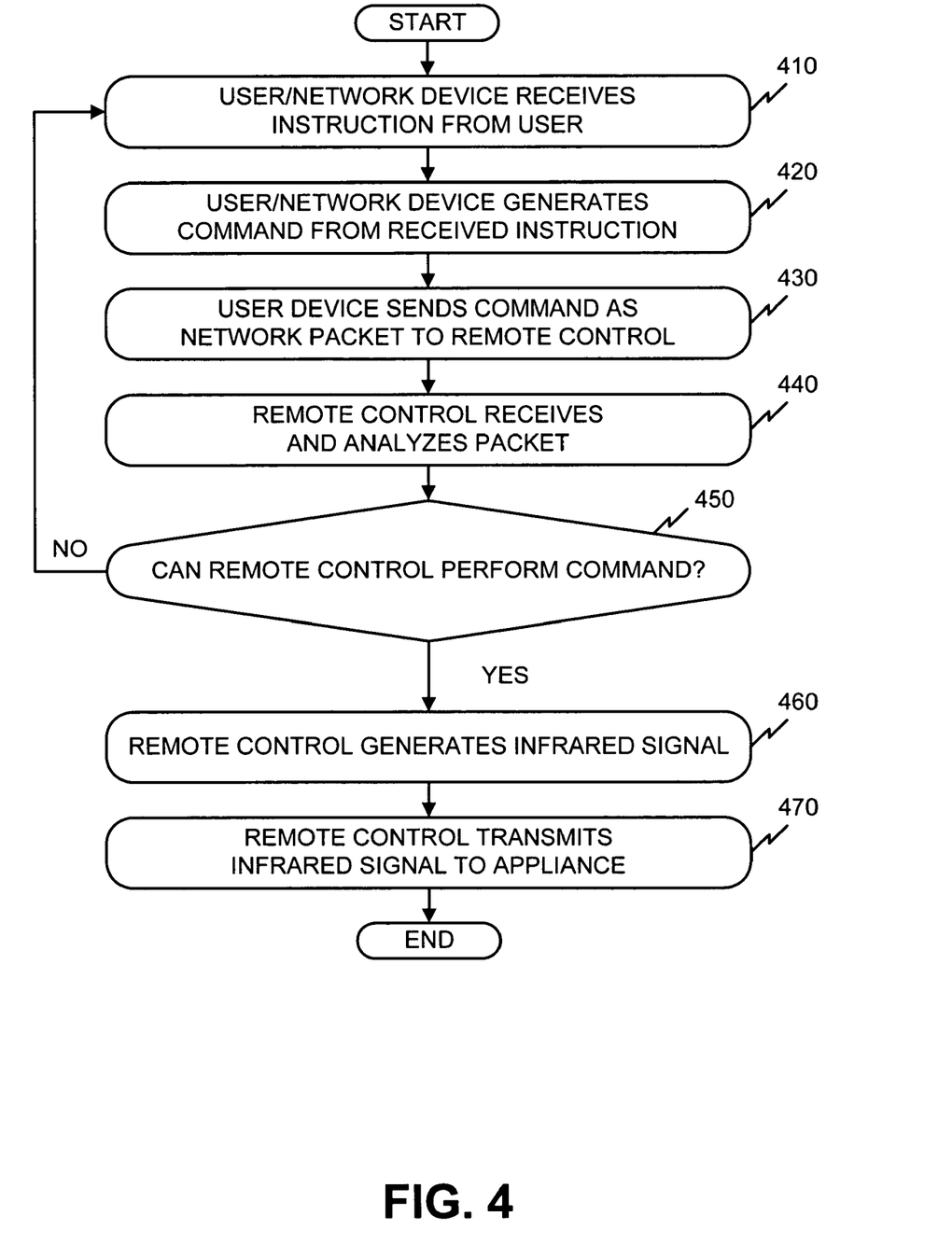
FIG. 4 is a flowchart of processing for controlling an appliance in an implementation consistent with the present invention.

FIG. 4 is a flowchart of processing for controlling an appliance in an implementation consistent with the present invention. Processing might begin with a user entering an instruction into the network device 150 or the user device 110 [step 410]. The network device 150 and user device 110 may be preprogrammed with a list of appliances 120 and their capabilities. In this case, the devices 150 and 110 may present the user with a list of appliances 120 and corresponding options from which the user may select. The devices 150 and 110 may provide graphical user interfaces to the user to facilitate the user's selection.

Figure 5:
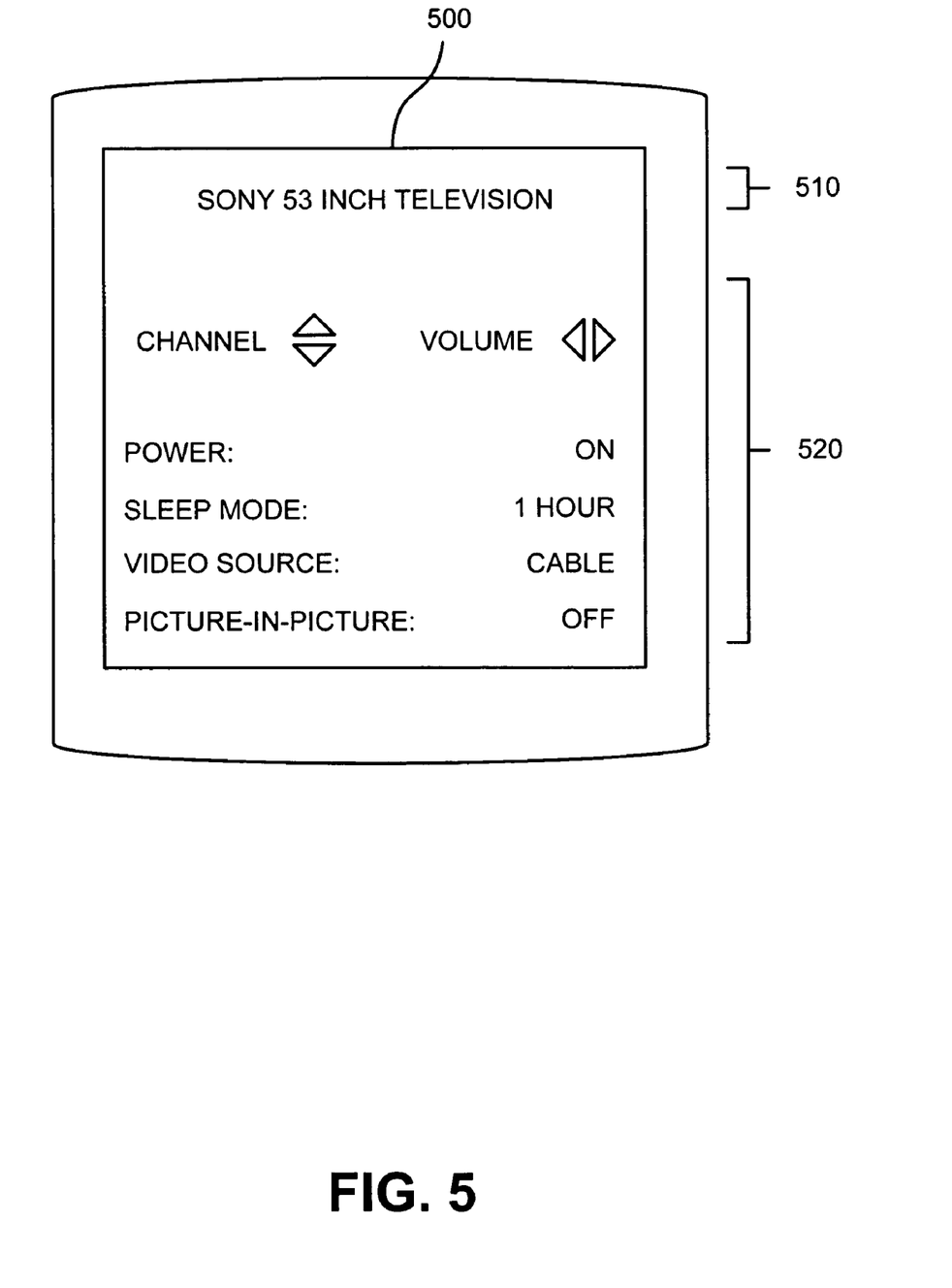
FIG. 5 is a diagram of an exemplary graphical user interface that may be provided by the network device and/or the user device of FIG. 1 in an implementation consistent with the present invention.

FIG. 5 is a diagram of an exemplary graphical user interface 500 for controlling a television that may be provided by the network device 150 and/or the user device 110 in an implementation consistent with the present invention. The graphical user interface 500 may include an appliance identifier 510, such as "Sony 53 Inch Television," to uniquely identify the appliance 120 being controlled, and one or more command components 520, such as channel and volume command components, to control the operation of the appliance 120.

Once the user enters the instruction, the network device 150 or user device 110 analyzes the instruction and generates a command signal therefrom [step 420]. If the user enters the instruction via the network device 150, the network device 150 transmits the command signal to the user device 110 via the network 160. For example, the network device 150 might use a modem to transmit the command signal to the user device 110.

The user device 110 generates a network packet from the command signal and transmits the network packet to the remote control 140 using conventional RF transmission techniques [step 430]. The receiver 320 (FIG. 3) of the remote control 140 receives the network packet and may convert it from analog to digital form [step 440]. The microcontroller 330 analyzes the packet to determine whether it is addressed to the remote control 140. To make this determination, the microcontroller 330 might compare a destination address in the packet to the network address of the remote control 140.

If the packet is not addressed to the remote control 140, the microcontroller 330 may simply discard it. If it is addressed to the remote control 140, the microcontroller 330 reads the packet to identify the command contained therein. The microcontroller 330 may then determine whether the remote control 140 can perform this command [step 450]. To make this determination, the microcontroller 330 may compare the command to a table of known commands. For example, if the command includes an instruction to increase the volume on a stereo, the microcontroller 330 determines whether it has the capability to increase the volume on the stereo.

If the command is not one that the remote control 140 can perform, the microcontroller 330 may discard it. If it is one that the remote control 140 can perform, the microcontroller 330 sends appropriate signals to the transmitter controller 340 to instruct it to generate an IR signal corresponding to the command. The signals sent by the microcontroller 330 may emulate signals generated by the input controller 370 in response to the same command being input via the input keys 360.

The transmitter controller 340 generates the IR signal [step 460] and transmits it to the IR receiving port of the intended appliance 120 [step 470]. To facilitate the transmission of the IR signal, it may be necessary that the transmitter 350 of the remote control 140 be pointed in the direction of the appliance 120.

Network Remote Control

Figure 6:
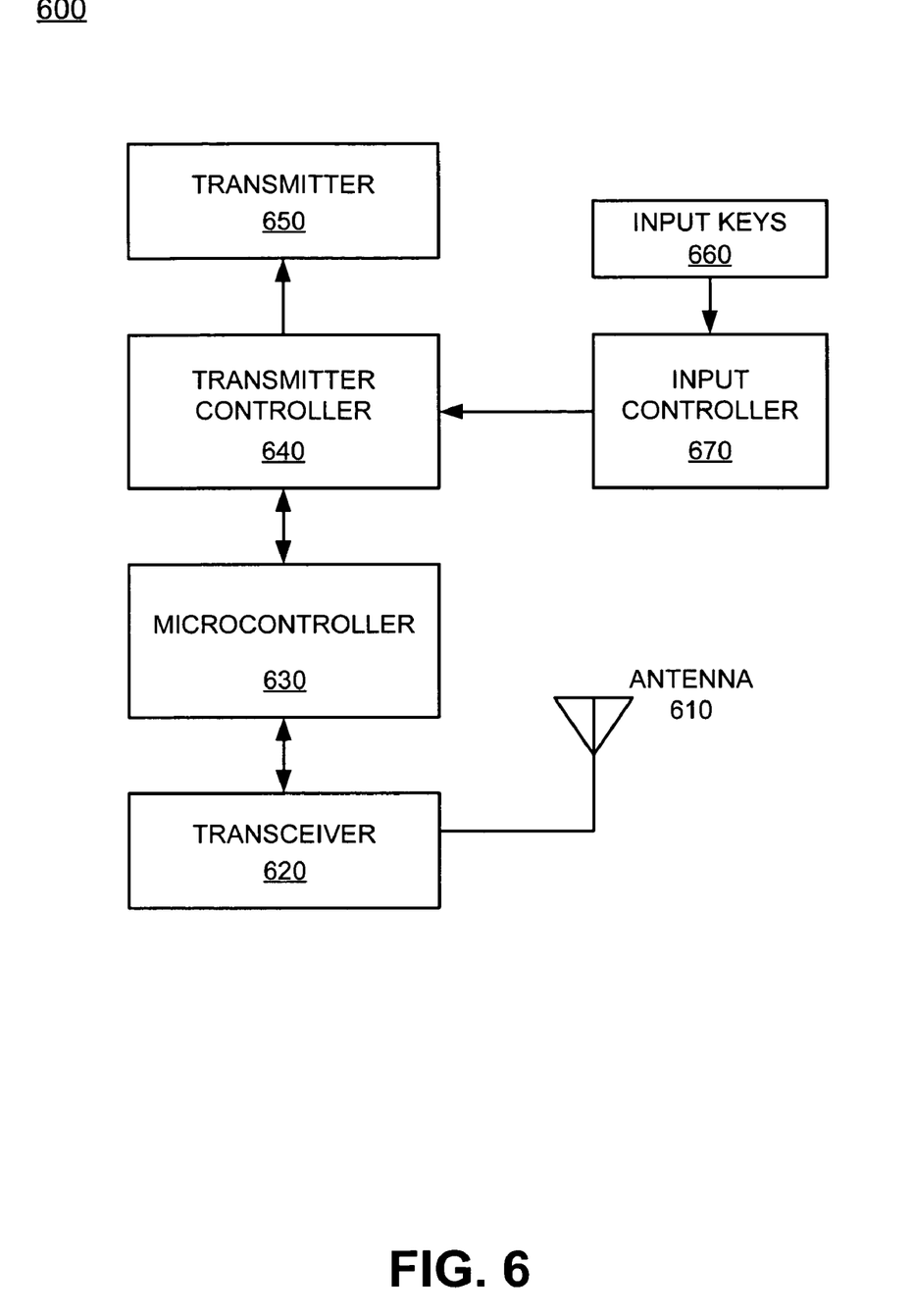
FIG. 6 is an exemplary diagram of a remote control in another implementation consistent with the present invention.

FIG. 6 is an exemplary diagram of a remote control 600 in another implementation consistent with the present invention. The remote control 600 has similar components to the remote control 140 of FIG. 3, but differs from the remote control 140 in that the remote control 600 has more networking capabilities and acts as a node in the network 100. The remote control 600 may include an antenna 610, a transceiver 620, a microcontroller 630, a transmitter controller 640, a transmitter 650, input keys 660, and an input controller 670.

The antenna 610 may include a conventional antenna for transmitting and receiving RF signals. The transceiver 620 may include an RF transceiver that interprets the RF signals received by the antenna 610, an analog-to-digital converter that converts the RF signals to digital signals for use by the microcontroller 630, and a digital-to-analog converter that converts digital signals from the microcontroller 630 to analog RF signals for transmission via the network 130.

The microcontroller 630 may include any processing device with networking capabilities that permit the remote control 600 to participate in the network 130 as a normal peripheral node. The microcontroller 630 may maintain information on the capabilities of the remote control 600 and respond to queries by providing this capability information to another device connected to the network 130. The microcontroller 630 may acknowledge and analyze commands received from the network.

The transmitter controller 640 may include a conventional control device that controls the transmission of IR signals via the transmitter 650. The transmitter controller 640 receives inputs from the microcontroller 630 and the input keys 660 via the input controller 670. The input keys 660 may include conventional input controls, such as buttons, that permit a user to input particular commands. The input controller 670 includes a conventional control device that interprets the operation of the input keys 660 and generates a command signal for transmission by the transmitter 650. The transmitter 650 may include an IR transmitter that transmits an IR signal as instructed by the transmitter controller 640.

Exemplary Processing with Network Remote Control

Figure 7:
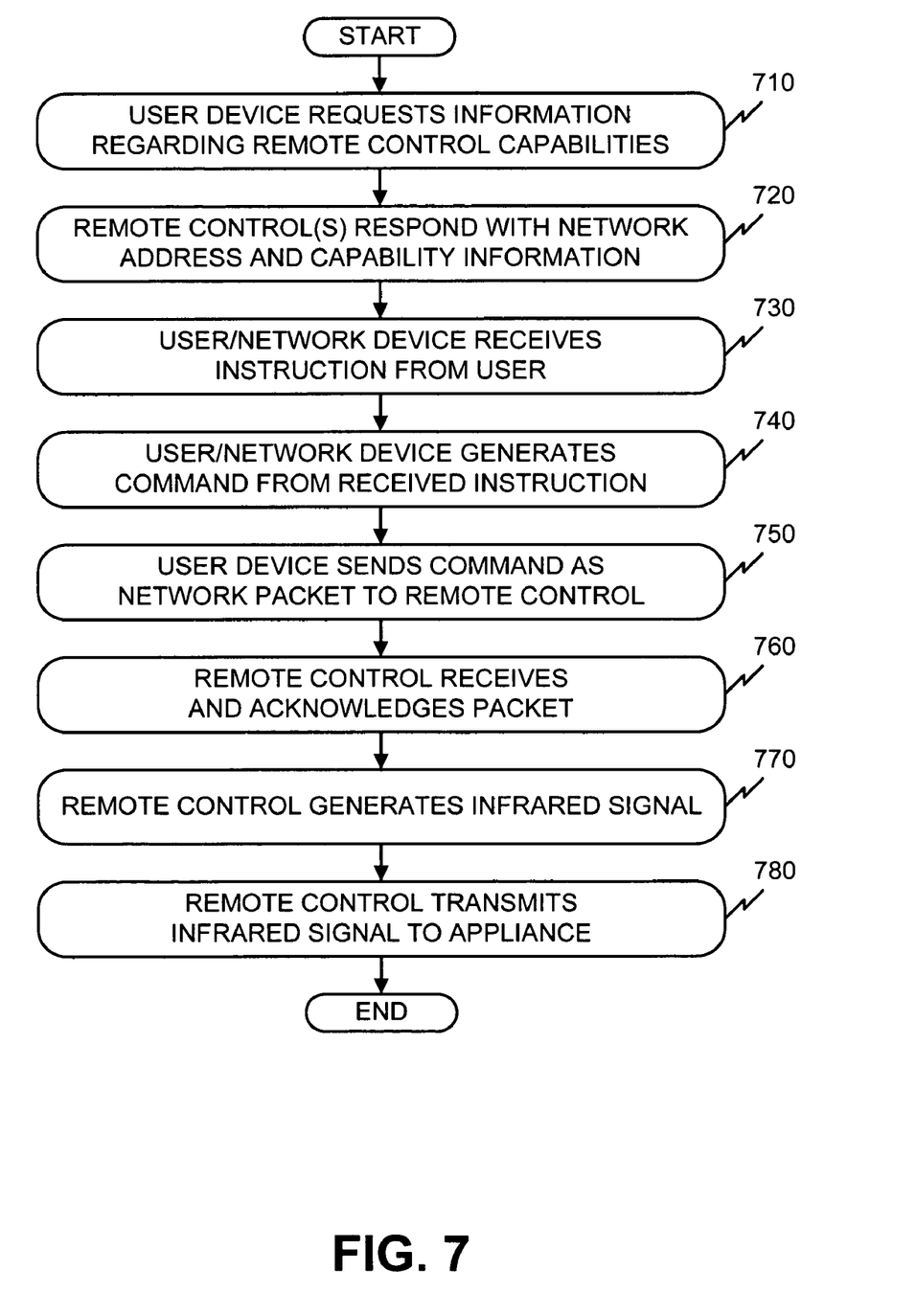
FIG. 7 is a flowchart of processing for controlling an appliance in another implementation consistent with the present invention.

FIG. 7 is a flowchart of processing for controlling an appliance in another implementation consistent with the present invention. Processing might begin with the user device 110 (FIG. 1) determining what remote controls 600 are available on the network. For example, the user device 110 may transmit a query, such as a standard "service discovery protocol," on the network 130 to determine what remote controls 600 are connected to the network 130 and their respective capabilities [step 710]. Each of the remote controls 600 may respond to the user device 110 with its network address and capabilities [step 720].

The user device 110 may provide the information received from the remote controls 600 to a user via a graphical user interface. For example, the user device 110 may present the user with a list of appliances 120 and corresponding options from which the user may select. If the user accesses the network 130 via a network device 150, instead of the user device 110, the network device 150 may obtain the information regarding the capabilities of the remote controls 600 from the user device 110 via the network 160.

In either case, the user device 110 or network device 150 receives an instruction from the user [step 730]. The user device 110 or network device 150 analyzes the instruction and generates a command signal therefrom [step 740]. If the user enters the instruction via the network device 150, the network device 150 transmits the command signal to the user device 110 via the network 160. For example, the network device 150 might use a modem to transmit the command signal to the user device 110.

The user device 110 may then generate a network packet from the command signal and transmit the network packet to a remote control 600 having the required capabilities [step 750]. The user device 110 may use conventional RF transmission techniques to transmit the packet.

The transceiver 620 (FIG. 6) of the remote control 600 receives the network packet and may acknowledge its receipt [step 760]. The microcontroller 630 may then analyze the packet to determine whether it is addressed to the remote control 600. To make this determination, the microcontroller 630 might compare a destination address in the packet to the network address of the remote control 600. If the packet is not addressed to the remote control 600, the microcontroller 630 may discard it.

If the packet is addressed to the remote control 600, the microcontroller 630 reads the packet to identify the command contained therein. The microcontroller 630 may then send the appropriate signals to the transmitter controller 640 to instruct it to generate an IR signal corresponding to the command. The signals sent by the microcontroller 630 may emulate signals generated by the input controller 670 in response to the same command being input via the input keys 660.

The transmitter controller 640 generates the IR signal [step 770] and transmits it to the IR receiving port of the intended appliance 120 [step 780]. To facilitate the transmission of the IR signal, it may be necessary that the transmitter 650 of the remote control 600 be pointed in the direction of the appliance 120.

CONCLUSION

Systems and methods consistent with the present invention permit conventional appliances to be controlled over a network. A user within a household may control the operation of one or more appliances using, for example, a personal computer. In addition, a user outside of the household may control these appliances using a device connected to a network, such as the Internet.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of steps have been described with regard to FIGS. 4 and 7, the order of the steps does not matter.

In addition, the preceding description described the remote control as controlling the operation of an appliance based on an instruction from a user. In another implementation consistent with the present invention, the user device 110 may be preprogrammed to automatically issue a command signal to the remote control for controlling the appliance based on what the user is doing on the user device.

The scope of the invention is defined by the claims and their equivalents.

What is claimed is:

1. A wireless remote control device operatively coupled to a user device via a network, the wireless remote control device comprising:
    a receiver configured to wirelessly receive from the user device via radio frequency (RF) technology over said network a network packet having a destination address and including at least one command, the at least one command for controlling operation of one of a plurality of household appliances;
    a controller configured to analyze the destination address of the received network packet to determine if the received network packet is intended for the wireless remote control device,
        wherein the controller is further configured to:
            store information regarding capabilities of the wireless remote control device, the capabilities of the wireless remote control device comprising a set of known commands, and
            identify the at least one command from the received network packet and compare the at least one command with the set of known commands to determine if the wireless remote control device can perform the at least one command; and
    an infrared (IR) transmitter which transmits an IR signal directly to each of the plurality of household appliances to control operation of said one of said appliances based on the at least one command and based on the controller determining that the received network packet is intended for the wireless remote control device,
        wherein each of said plurality of household devices comprises an IR receiving port for receiving the IR signal directly from the IR transmitter.

2. The device of claim 1 further comprising:
    a transmitter controller configured to generate the signal based on the at least one command when the controller determines that the network packet is intended for the wireless remote control device.

3. The device of claim 1 wherein the controller is configured to compare the destination address in the received network packet to a network address for the wireless remote control device to determine whether the received network packet is intended for the wireless remote control device.

4. The device of claim 1 wherein the receiver includes:
    a transceiver configured to receive the received network packet and acknowledge receipt of the received network packet.

5. The device of claim 4 wherein the controller is further configured to receive a request for information regarding the capabilities of the wireless remote control device and transmit a reply containing the requested information.

6. A system including a plurality of appliances, comprising:
    a user device configured to generate a command for controlling one of the appliances and transmit the command via a wireless network in a packet, the packet having a remote control destination address indicating that the command is intended for a target remote control device having said address; and
    a plurality of remote controls, each of the remote controls including an apparatus which:
        wirelessly receives the packet via radio frequency (RF) technology over said wireless network, the packet including the command,
        determines, based on the remote control destination address, if the command from the user device is intended for the target remote control device,
            whereby it is determined that the remote control is the target remote control device based on the remote control destination address corresponding to the address of the target remote control device,
        determines if the target remote control device can perform the command,
            wherein the target remote control device stores information regarding capabilities of the target remote control device, the capabilities comprising a set of known commands, and the target remote control device determines if it can perform the command by comparing the command with the set of known commands,
        generates, based on the determination that the command is intended for the target remote control device and the determination that the target remote control device can perform the command, an infrared (IR) control signal based on the command, and
        transmits the IR control signal directly to an IR receiving port on the one of the appliances to control operation of the one of the appliances,
            wherein each of said plurality of appliances comprises an IR receiving port for receiving the IR signal, and
        wherein the user device is further configured to transmit a request to each of the plurality of remote controls via the wireless connection to determine capabilities of each one of the plurality of remote controls; and
        wherein each of the plurality of remote controls is further configured to store information regarding the capabilities of itself and transmit the information to the user device via the wireless connection in response to the request, the information comprising the set of known commands.

7. The system of claim 6, further comprising:
    a network device connected to the remote control via a network.

8. The system of claim 7, wherein the network includes the Internet.

9. The system of claim 6, wherein each of the plurality of remote controls is further configured to transmit a network address corresponding to itself in response to the request.

10. The system of claim 6, wherein the device includes:
    a graphical user interface to facilitate control of the appliances by a user.

11. A method comprising:
    sending to a wireless network, via a user device connected to said wireless network, a request for information regarding capabilities of each of a plurality of remote controls available on said wireless network, each remote control associated with a plurality of appliances, each of said plurality of appliances comprising an infrared receiving port; and
    receiving from each of said remote controls by the user device, in response to the request, information of each of said remote controls, the information including a network address of said remote control and capabilities of said remote control;
providing on the user device, via a graphical user interface (GUI), an indication of said plurality of appliances and said capabilities of the plurality of remote controls;
receiving an instruction by said user device, the instruction being for controlling a selected one of said plurality of appliances;
determining, based on said instruction, a command signal and a destination network address associated with one of said remote controls associated with the selected appliance, the network address being determined based on the received information of each of said remote controls;
generating a network packet including said command and said destination network address and transmitting said network packet to at least one of said plurality of remote controls over said wireless network;
analyzing, by the at least one of said plurality of remote controls, said network packet to determine if said destination network address matches a network address of one of said at least one of said plurality of remote controls;
receiving, by the user device, an acknowledging message indicating receipt of said network packet from said one of said plurality of remote controls;
reading, by the at least one of said plurality of remote controls, said network packet at said one of said remote controls to identify said command;
comparing, by the at least one of said plurality of remote controls, the identified command with a set of known commands to determine if the at least one of said plurality of remote controls can perform the at least one command, the set of known commands being stored in the at least one of said plurality of remote controls; and
transmitting, directly from the at least one of said plurality of remote controls to the infrared receiving port of the selected appliance, an infrared signal including said identified command.

12. A method comprising:
sending to a wireless network, via a user device connected to said wireless network, a request for information regarding capabilities of each of a plurality of remote controls available on said wireless network, each remote control associated with a plurality of appliances, each of said plurality of appliances comprising an infrared receiving port; and
receiving from each of said remote controls by the user device, in response to the request, information of each of said remote controls, the information including a network address of said remote control and capabilities of said remote control;
receiving an instruction by said user device, the instruction being for controlling a selected one of said plurality of appliances;
determining, based on said instruction, a command signal and a destination network address associated with one of said remote controls associated with the selected appliance, the network address being determined based on the received information of each of said remote controls;
generating a network packet including said command and said destination network address and transmitting said network packet to at least one of said plurality of remote controls including said one of said remote controls associated with the selected appliance over said wireless network;
analyzing, by the at least one of said plurality of remote controls, said network packet to determine if said destination network address matches a network address of one of said at least one of said plurality of remote controls;
receiving, by the user device, an acknowledging message indicating receipt of said network packet from said one of said plurality of remote controls;
reading, by the at least one of said plurality of remote controls, said network packet at said one of said remote controls to identify said command;
comparing, by the at least one of said plurality of remote controls, the identified command with a set of known commands to determine if the at least one of said plurality of remote controls can perform the at least one command, the set of known commands being stored in the at least one of said plurality of remote controls; and
transmitting, directly from the at least one of said plurality of remote controls to the infrared receiving port of the selected appliance, an infrared signal including said identified command.

13. The method of claim 12 wherein said one of said remote control devices includes a transceiver configured to receive said network packet and transmit and acknowledgement of receipt of said network packet.

14. The method of claim 12 wherein the capabilities determining includes:
receiving, by said user device, from said one of said remote control devices a set of commands associated with the appliance.

15. The method of claim 12 further comprising:
receiving a request for information regarding the capabilities of said one of said remote control devices, and
transmitting a reply containing a set of commands associated with the appliance.

16. The method of claim 12 further comprising:
receiving, at one of said plurality of remote control devices, a request for information regarding the capabilities of said one of said plurality of said remote control devices, and
transmitting a reply containing the set of known commands.

17. A system comprising:
a plurality of wireless remote control devices operatively coupled to a user device via a wireless network, wherein each of the wireless remote control devices receives, via radio frequency (RF) technology over the wireless network, from the user device, a network packet, the network packet including a wireless remote control device destination address and at least one command for controlling an appliance, the plurality of wireless remote control devices including a target appliance controlling device having said destination address, the target appliance controlling device including:
a receiver configured to wirelessly receive from the user device via radio frequency (RF) technology the network packet;
a controller configured to analyze the wireless remote control device destination address of the network packet to determine if the received network packet is intended for the target appliance controlling device, wherein the controller is further configured to:
store information regarding capabilities of the target appliance controlling device, the capabilities of the target appliance controlling device comprising a set of known commands, and identify the at least one command included in the network packet and compare the at least one command with the set of known commands to determine if the target appliance controlling device can perform the at least one command; and an infrared (IR) transmitter which transmits an IR signal directly to the appliance to control operation of the appliance based on the at least one command and based on the controller determining that the received network packet is intended for the target appliance controlling device and the controller determining that the target appliance controlling device can perform the at least one command, wherein said appliance is one of a plurality of appliances, where each of said plurality of appliances comprises an IR receiving port for receiving the IR signal directly from the transmitter.

18. The system of claim 17 wherein the target appliance controlling wireless remote control device further comprises:

a transmitter controller configured to generate the signal based on the at least one command when the controller determines that the network packet is intended for the target appliance controlling wireless remote control device.

* * * * *